United States Patent
Swayne et al.

(10) Patent No.: US 10,982,446 B2
(45) Date of Patent: Apr. 20, 2021

(54) HEAVY GLASS MAT IMPACT RESISTANT ROOFING

(71) Applicant: TAMKO Building Products, LLC, Galena, KS (US)

(72) Inventors: Matthew Swayne, Sarcoxie, MO (US); Jason Hance, Joplin, MO (US)

(73) Assignee: TAMKO Building Products, LLC, Galena, KS (US)

( * ) Notice: Subject to any disclaimer, the term of this patent is extended or adjusted under 35 U.S.C. 154(b) by 0 days.

(21) Appl. No.: 16/370,450

(22) Filed: Mar. 29, 2019

(65) Prior Publication Data

US 2019/0309518 A1    Oct. 10, 2019

Related U.S. Application Data

(60) Provisional application No. 62/653,691, filed on Apr. 6, 2018.

(51) Int. Cl.
| | |
|---|---|
| *E04D 1/28* | (2006.01) |
| *E04D 1/30* | (2006.01) |
| *B32B 7/022* | (2019.01) |
| *B32B 11/02* | (2006.01) |
| *E04D 1/22* | (2006.01) |
| *E04C 5/07* | (2006.01) |

(52) U.S. Cl.
CPC ............... *E04D 1/28* (2013.01); *B32B 7/022* (2019.01); *B32B 11/02* (2013.01); *E04C 5/073* (2013.01); *E04D 1/22* (2013.01); *E04D 1/30* (2013.01); *B32B 2250/03* (2013.01); *B32B 2395/00* (2013.01); *B32B 2419/06* (2013.01)

(58) Field of Classification Search
CPC .... E04D 1/28; E04D 1/20; E04D 1/22; E04D 1/30; B32B 7/022; B32B 2307/558; B32B 2250/03; B32B 2250/40; B32B 2307/718; B32B 2262/101; B32B 2262/106
See application file for complete search history.

(56) References Cited

U.S. PATENT DOCUMENTS

| | | | |
|---|---|---|---|
| 4,287,248 | A | 9/1981 | Gessner et al. |
| 4,804,696 | A | 2/1989 | Jolitz et al. |
| 5,026,747 | A | 6/1991 | Jolitz et al. |
| 5,102,436 | A | 4/1992 | Grabowski |
| 5,571,596 | A | 11/1996 | Johnson |
| 6,207,593 | B1 | 3/2001 | Fields |
| 6,228,785 | B1 | 5/2001 | Miller et al. |
| 6,341,462 | B2 | 1/2002 | Kiik et al. |

(Continued)

FOREIGN PATENT DOCUMENTS

CN    108457429 A    8/2018

OTHER PUBLICATIONS

Church Mutual Insurance Company "Roofing Product Comparisons" Sep. 2014.

*Primary Examiner* — Beth A Stephan
(74) *Attorney, Agent, or Firm* — Cochran Freund & Young LLC; William W. Cochran

(57) ABSTRACT

Disclosed is impact resistant roofing that utilizes a heavy glass mat substrate having a weight of at least 3.0 lbs/csf that meets high impact resistance roofing standards. The impact resistant roofing utilizes a heavy glass mat that is embedded between two layers of asphalt. The impact resistant roofing can be manufactured on standard, existing roofing lines without modification.

2 Claims, 2 Drawing Sheets

(56) References Cited

U.S. PATENT DOCUMENTS

| | | |
|---|---|---|
| 6,426,309 B1 | 7/2002 | Miller et al. |
| 6,709,994 B2 | 3/2004 | Miller et al. |
| 7,442,658 B2 | 10/2008 | Rodrigues et al. |
| 7,670,668 B2 | 3/2010 | Greaves et al. |
| 7,836,654 B2 | 11/2010 | Belt et al. |
| 8,226,790 B2 | 7/2012 | Rodriques et al. |
| 8,231,443 B1 | 7/2012 | Tomcak et al. |
| 8,240,102 B2 | 8/2012 | Belt et al. |
| 8,623,164 B2 | 1/2014 | Belt et al. |
| 8,802,215 B2 | 8/2014 | Kalkanoglu et al. |
| 9,010,058 B2 | 4/2015 | DeJarnette et al. |
| 9,021,760 B2 | 5/2015 | Kiik et al. |
| 9,242,432 B1 | 1/2016 | Harrington, Jr. et al. |
| 9,259,860 B2 | 2/2016 | Kalkanoglu et al. |
| 9,404,263 B2 | 8/2016 | Kiik et al. |
| 9,441,140 B2 | 9/2016 | Zhou et al. |
| 9,447,581 B2 | 9/2016 | Harrington et al. |
| 9,605,434 B2 | 3/2017 | Belt et al. |
| 9,909,317 B2 | 3/2018 | Johnson et al. |
| 2007/0207690 A1* | 9/2007 | Huddy ............... B32B 17/02 442/136 |
| 2008/0160188 A1* | 7/2008 | Teng ................ B05D 1/30 427/186 |
| 2010/0151198 A1 | 6/2010 | Khan |
| 2011/0189433 A1* | 8/2011 | Kiik ................ E04D 3/35 428/144 |
| 2013/0025225 A1 | 1/2013 | Vermilion et al. |
| 2014/0272244 A1 | 9/2014 | Harrington, Jr. et al. |
| 2015/0218823 A1 | 8/2015 | Shiao et al. |
| 2015/0240494 A1 | 8/2015 | Kiik et al. |
| 2015/0259919 A1* | 9/2015 | Lewis ............... C09D 195/00 428/116 |
| 2015/0259920 A1* | 9/2015 | Hassan ............... E04D 1/20 428/148 |
| 2017/0067257 A1 | 3/2017 | Zhou et al. |
| 2017/0158440 A1 | 6/2017 | Belt et al. |
| 2017/0197379 A1* | 7/2017 | Teng ............... D06N 3/0063 |

* cited by examiner

HEAVY GLASS MAT IMPACT RESISTANT ROOFING

CROSS-REFERENCE TO RELATED APPLICATION

This Non-Provisional patent application claims the benefit of the Provisional U.S. Patent Application No. 62/653,691, entitled "Heavy Glass Mat Impact Resistant Roofing," which was filed with the U.S. Patent & Trademark Office on Apr. 6, 2018, which is specifically incorporated herein by reference for all that it discloses and teaches.

BACKGROUND OF THE INVENTION

Shingle technology has advanced greatly over the past few decades. Roof shingles and roll roofing provide protection for houses and buildings to prevent leakage of rain water into the interior of the building. Various types of materials have been used to make shingles including asphalt and other materials. In addition, waterproofing materials have protected foundations and other surfaces from water penetration. As used herein, "roofing materials" includes roof shingles, roll roofing and waterproofing materials, even if such waterproofing materials are used on foundations and other places.

SUMMARY OF THE INVENTION

An embodiment of the present invention may therefore comprise impact resistant roofing comprising: a heavy fiberglass mat having a weight of at least 3.0 lbs/csf; a first asphalt layer disposed on a top portion of the heavy glass mat substrate; a second asphalt layer disposed on a bottom surface of the heavy fiberglass mat substrate.

An embodiment of the present invention may further comprise a method of manufacturing impact resistant roofing comprising: providing a heavy fiberglass mat substrate having a weight of at least 3.0 lbs/csf; placing a first asphalt layer over a top surface of the heavy fiberglass mat substrate; placing a second asphalt layer on a bottom surface of the heavy fiberglass mat substrate.

DETAILED DESCRIPTION OF THE EMBODIMENTS

Figure 1:
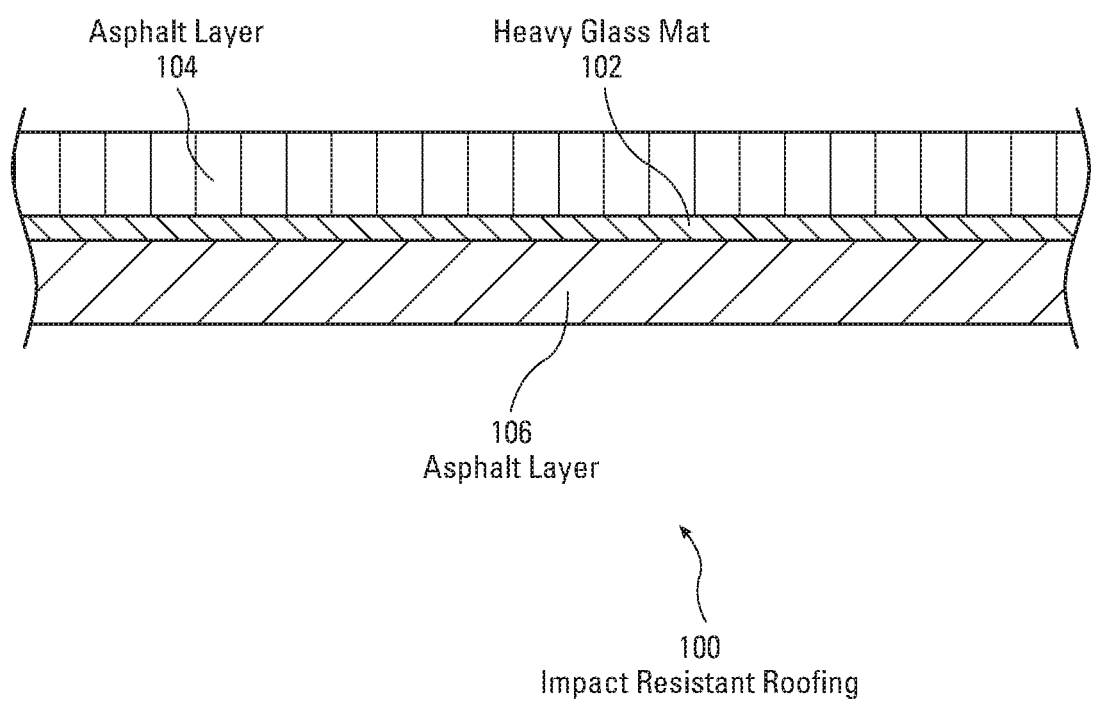
FIG. 1 is a schematic cross-sectional view of an impact resistant roofing.

FIG. 1 is a schematic cross-sectional view of an embodiment of an impact resistant rooting 100. As illustrated in FIG. 1, a heavy glass mat 102 is surrounded by asphalt layer 104 on a top surface, and an asphalt layer 106 on a bottom surface. Impact resistant roofing, especially the impact resistant shingles that meet the Underwriters Laboratory Standard UL 2218, Class IV impact requirements, have been constructed in various ways. For example, many manufacturers utilize a glass mat substrate and an additional glass mat, scrim or layer of polymer or other material that is located on the back or bottom surface of the roofing material. A second glass mat, scrim or layer of polymer is attached to the bottom surface an asphalt layer 106 in prior art roofing. As such, additional structural rigidity is provided to the shingle that resists impacts, Other techniques for providing impact resistance include adding certain polymers, oils and waxes to the asphalt material to soften the asphalt material so that the shock forces from impacts are absorbed more easily by the asphalt, since the asphalt is made less brittle. These techniques for manufacturing roofing, and other techniques for meeting the UL 2218, Class IV impact resistant test, are expensive and add complexity to the manufacturing line for the impact resistant roofing. The complexity and additional cost of adding an additional fiberglass layer or other layer can greatly increase the cost of impact resistant roofing material.

The Underwriters Laboratory has a standard for impact resistance testing that is identified as UL 2218. The test provides impact resistance data for the valuation of prepared roof covering materials such as shingles. The test evaluates the impact from a steel ball from locations on the roofing material selected to be most vulnerable, such as corners, unsupported sections, and joints. The test method does not evaluate the effects of weathering, temperature, aging or similar effects on impact resistance. The impact energy used in the standard is derived from impact energy of actual hailstones. However, there is no currently established direct correlation between the performance of roof covering materials when impacted by hailstones versus steel balls, as used in UL 2218. Consequently, the test method does not provide a direct basis to compare expected performance under all hail conditions, but does provide a basis for comparison of the response of roof covering when subjected to the impact energies described.

There are classes of impact resistance running from Class I to Class IV. Class IV roofing has the highest impact resistance. Class IV impact resistance is tested by dropping 2-inch steel balls onto the roofing material from a height of twenty feet, so that the steel balls impact the roofing material in the various locations. If the roofing material can withstand the impacts from the steel balls and not produce cracks, punctures, tears, splits or ruptures, or otherwise separate the fibers of the fiberglass mat, the shingle passes the class IV impact testing. Tests were performed by Underwrites Laboratory on a sample shingle having a mat weight of 3.2 lbs/cfs. This shingle was made in the TAMKO Joplin plant by TAMKO Building Products, Inc. The test was performed to rate the shingles for Class IV pursuant to Underwriters Laboratory Test Standard 2218, i.e., UL 2218. The 2-inch steel balls were dropped from 20 feet on various portions of the shingle.

On the first course, the ball was dropped over a center support on a double layer of the shingle. On the second course, the ball was dropped over the center support on a single layer of the shingle. On the third course, the ball was dropped over the left side on the edge of a double layer. On the fourth course, the ball was dropped over the left side above the edge of a single layer. On the fifth course, the ball was dropped on the right side on the head lap of a double layer. On the sixth course, the ball was dropped on the right side on the head lap of a single layer. On the first course, there was a depression of 0.06 inches. On the second course, there was a depression of 0.09 inches. On the third course, there was a depression of 0.04 inches. On the fourth course, there was a depression of 0.06 inches. On the fifth course, there was a depression of 0.04 inches, and on the sixth course, there was a depression of 0.07 inches. No damage was detected for this test. This shingle, therefore, passed the Class IV UL 2218 standard. There was no evidence of tearing, fracturing, cracking, splitting, rupture, crazing, or other evidence of opening of the roof covering layer. A second test was run with a similar result and the second shingle also passed the Class IV UL 2218 standard.

In accordance with the present invention, it has been determined that by increasing the weight and thickness of the fiberglass mat substrate to at least 3.0 lbs/cfs, a substantially equal amount of impact resistance can be achieved as using additional layers of film or supporting materials, while avoiding the additional cost and complexity of using separate fiberglass layers or layers of other materials attached to a back surface of the roofing. In this manner, impact resistant roofing, especially impact resistant roofing that can pass the UL 2218, Class IV impact test, can be achieved at a fraction of the cost and complexity of other techniques of manufacturing an impact resistant shingle. The heavy glass mat 102 is sufficient to absorb the shock forces of the various impacts and cause those forces to be spread over the surface of the heavy glass mat 102 to lessen the forces in any single location. The heavy glass mat 102 has a weight of at least 3.0 lbs/csf and preferably 3.2 lbs/csf, to routinely pass the class IV impact test.

Figure 2:
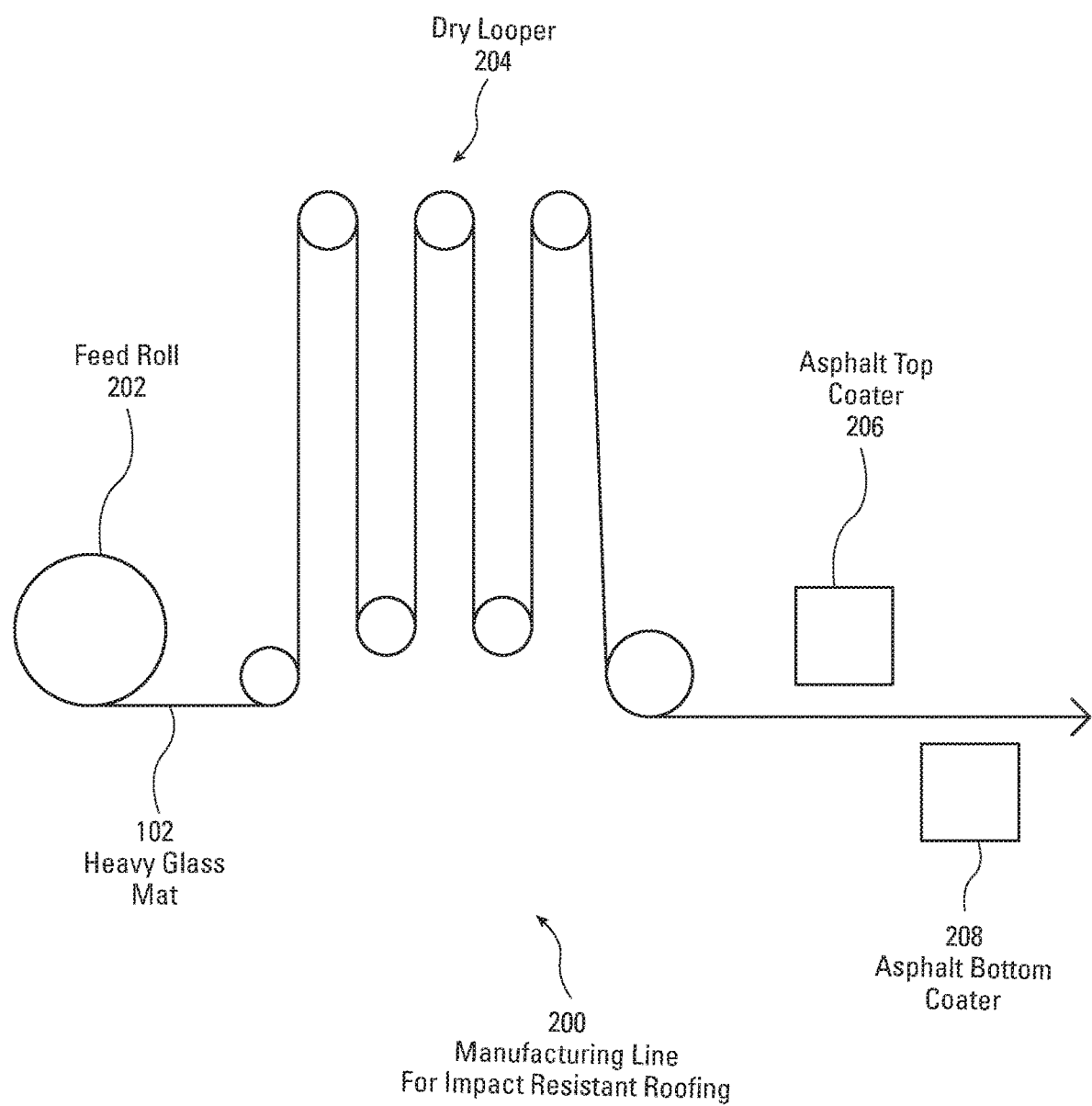
FIG. 2 is a schematic side view of an embodiment of a portion of a manufacturing line for manufacturing the embodiment of the impact resistant roofing illustrated in FIG. 1.

FIG. 2 is a schematic side view of an embodiment of a portion of the manufacturing line 200 for constructing the embodiment of the impact resistant roofing illustrated in FIG. 1. As illustrated in FIG. 2, the feed roll 202 supplies the heavy glass mat 102 that has a weight of at least 3.0 lbs/csf. The heavy glass mat 102 is fed through a dry looper 204 that is used as a buffer to absorb any slow down or stoppage in the feed roll 202. The heavy glass mat 102 is then fed to an asphalt top coater 206, which applies the asphalt layer 104 (FIG. 1) to the top surface of the heavy glass mat 102. The heavy glass mat 102 then proceeds to an asphalt bottom coater 208, which applies the bottom asphalt layer 106 (FIG. 1) to the heavy glass mat 102. Once the top asphalt layer 104 and bottom asphalt layer 106 are applied to the heavy glass mat 102, the composite then proceeds to the remaining portion of the manufacturing line 200.

Consequently, an impact resistant roofing can be constructed by utilizing a heavy glass mat 102 that has a weight of at least 3.0 lbs/csf so that the impact resistant roofing passes the UA 2218, Class IV impact test. In this manner, impact resistant roofing can be manufactured in a simple and easy fashion without the complexities of additional fiberglass or other impact resistant layers in the shingle, and at a fraction of the cost of more complex techniques of creating impact resistant roofing. Further, most existing roofing manufacturing lines can be utilized, without modification, to create a UL 2218, Class IV impact resistant roofing.

What is claimed is:

1. Impact resistant roofing comprising:
   a single fiberglass mat substrate having a weight of 3.2 lbs/csf;
   a first asphalt layer disposed on a top portion of said single fiberglass mat substrate;
   a second asphalt layer disposed on a bottom surface of said single fiberglass mat substrate;
   wherein said impact resistant roofing exhibits impact resistance when a 2-inch steel ball is dropped from 20 feet onto said impact resistant roofing.

2. A method of manufacturing impact resistant roofing comprising:
   providing a single fiberglass mat substrate having a weight of 3.2 lbs/csf;
   placing a first asphalt layer over a top surface of said single fiberglass mat substrate;
   placing a second asphalt layer on a bottom surface of said single fiberglass mat substrate;
   wherein said impact resistant roofing exhibits impact resistance when a 2-inch steel ball is dropped from 20 feet onto said impact resistant roofing.

\* \* \* \* \*

UNITED STATES PATENT AND TRADEMARK OFFICE
CERTIFICATE OF CORRECTION

Page 1 of 1

PATENT NO. : 10,982,446 B2
APPLICATION NO. : 16/370450
DATED : April 20, 2021
INVENTOR(S) : Matthew Swayne and Jason Hance It is certified that error appears in the above-identified patent and that said Letters Patent is hereby corrected as shown below:

On the Title Page

Item (73) The Assignee should be corrected from "TAMKO Building Products, LLC" to "TAMKO Building Products LLC"

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*